May 21, 1963 T. E. BRANDENBURG 3,090,945

SEQUENCE COMPARING UNIT

Filed Sept. 8, 1959 4 Sheets-Sheet 1

INVENTOR
THOMAS E. BRANDENBURG

BY Carl C. Kling

ATTORNEY

May 21, 1963 T. E. BRANDENBURG 3,090,945
SEQUENCE COMPARING UNIT
Filed Sept. 8, 1959 4 Sheets-Sheet 2

May 21, 1963 T. E. BRANDENBURG 3,090,945

SEQUENCE COMPARING UNIT

Filed Sept. 8, 1959 4 Sheets-Sheet 3

May 21, 1963 T. E. BRANDENBURG 3,090,945

SEQUENCE COMPARING UNIT

Filed Sept. 8, 1959 4 Sheets-Sheet 4

United States Patent Office 3,090,945

Patented May 21, 1963

3,090,945

SEQUENCE COMPARING UNIT

Thomas E. Brandenburg, Poughkeepsie, N.Y., assignor to International Business Machines Corporation, New York, N.Y., a corporation of New York Filed Sept. 8, 1959, Ser. No. 838,689
10 Claims. (Cl. 340—172.5)

This invention relates to a data comparing circuit, and particularly to a sequence comparing unit for comparing incoming groups of data, or an incoming group of data with a group of data previously received, to ascertain the relative values of the two groups and emit control signals indicating the result of the comparison.

The invention finds particular use in dual-feed record card sorters (collating machines) where the sequence of record card feeding is controlled by the sequence of the data recorded upon the cards being read in each of two data sources or reading feeds. A typical collating operation is merging by descending card sequence, wherein it is required to control the two feeds to feed the card having the higher sequence control number only, or, if the cards are equal, to feed both cards simultaneously. If the feeds are designated primary and secondary the required three control signals may be designated high primary, high secondary and equal. These control signals operate magnets and clutches to control card feeding and other machine functions.

The fact that there may be several cards in one feed which are higher than the card in the other feed requires that the low card be held stationary for several feed cycles. In each feed cycle it must be compared with the card in the other feed for high-low-equal conditions, which requires either a repetitive-read operation or data storage which can be compared with the indications being read from a card. This problem does not exist in single-feed sorters, where electronic sequence checking circuits have become known.

A prior art collating machine reads cards just once, and sets up mechanical ratchets which by their position represent digit values. The ratchets remain in place until reset. If both primary and secondary feeds operate on card cycle 1 (following an equal) the primary ratchets and secondary ratchets operate simultaneously, setting up the data read from their respective cards. If the primary card is higher, a differential mechanism associated with the ratchets operates a contact to generate a "high primary" control signal, which operates the primary feed and resets the primary ratchets on the next cycle. The secondary ratchets hold their values.

On the next cycle, only the primary card is read, setting up the primary ratchets for comparison with the secondary ratchets. If the secondary card should be higher, a "high secondary" control signal operates the secondary feed and resets the secondary ratchets.

An object of the invention is to provide electronic means for comparing groups of source data from plural sources, emitting control signals according to the result of the comparison, and retaining less than all of the groups of data for subsequent comparison with additional groups of source data.

A special object of the invention is to provide an electronic replacement for mechanical ratchet comparing units on existing collating machines.

A further object of the invention is to provide novel electronic sequence comparing means for multiple feed collating machines, in which comparing means there are no moving parts.

A further object is to increase speed and reliability of a sequence comparing unit and to reduce noise, power dissipation and cost.

*Summary of Features*

The sequence comparing unit accepts control number data from one or more of a plurality of data sources, such as the primary and secondary reading brushes in a collator. The digit values of the source data are entered into counters, one for each digit order from each source, to be used on succeeding card cycles as needed. Comparing means compares the equal order digits from each source, and causes a comparison representation to be entered into a special shifting order storage register. All orders are compared in parallel; the order register, after comparison, holds the order-by-order comparison representations.

After comparison is completed, the order register shifts, high order first, its content into a sequence-equal circuit which is reset to "equal." If the high order is equal, no change will result. If the next higher order is "high primary," the sequence-equal circuit switches to "high primary" and locks, regardless of further order comparisons. Should it be "high secondary," the sequence-equal circuit would lock on "high secondary." If the order register shifts through all the orders of which it is capable, without a high primary or high secondary, the sequence-equal circuit remains at equal.

After shifting is completed, the sequence-equal circuit is interrogated for condition, producing a sequence-indicating control pulse, and the circuit is reset to equal.

If the condition is "high primary" and the analyzing means is set to merge on descending sequence, the primary feed is clutched, while the secondary feed remains latched. On the next cycle, the data for comparison for the secondary is not available from the card, but remains in the set of secondary counters. These counters are read out synchronously with card reading to emit digits at the same machine timings as equal digits read from the card. For example, a high order 5 digit stored in the secondary is presented to the comparing means indistinguishably from the high order 5 digit read from the primary card. A first-to-arrive-is-higher logical comparison is thus made practical, if the card is read high-digit first (9-edge first).

The foregoing and other objects, features and advantages of the invention will be apparent from the following more particular description of a preferred embodiment of the invention, as illustrated in the accompanying drawings.

Figure 1:
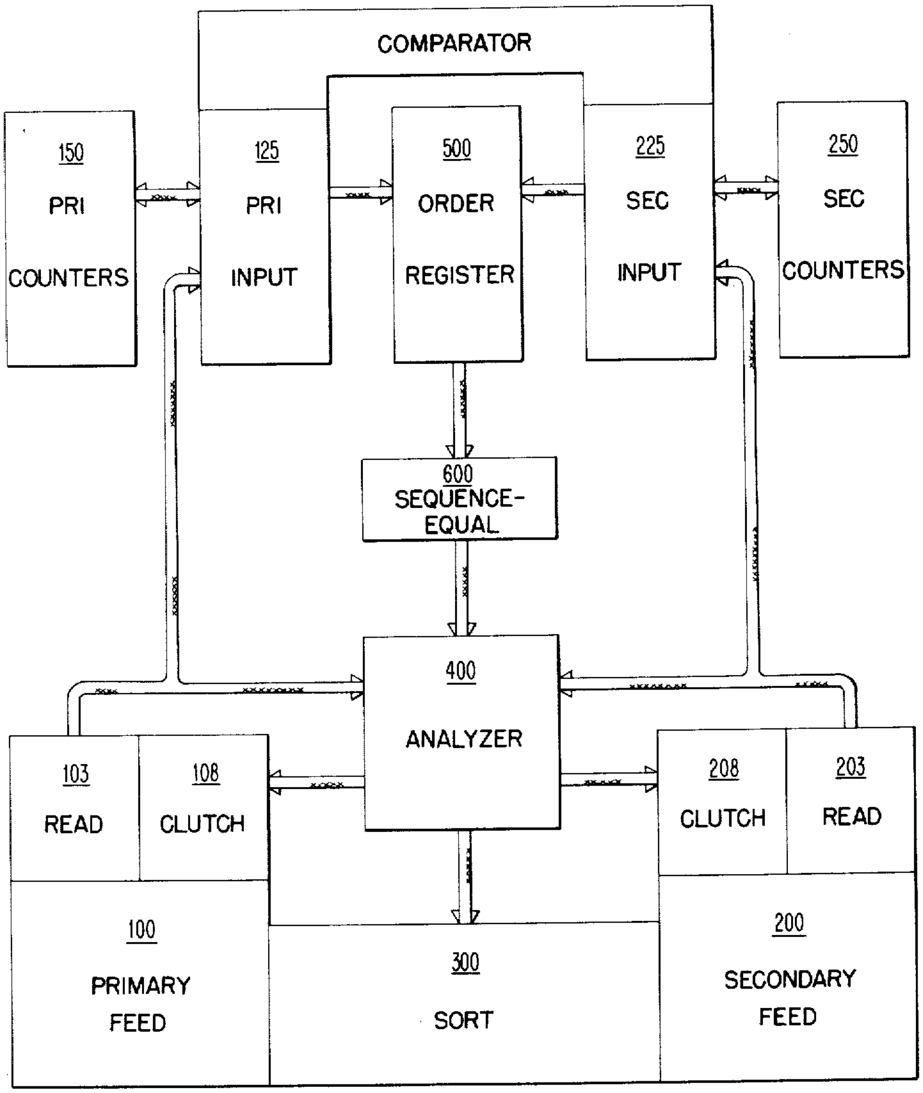
FIG. 1 is a functional block diagram of the invention operating with a collator.

*FIG. 1—Functional Block Diagram*

A suitable collator has two reading feeds, a primary feed 100 and secondary feed 200. A sort unit 300 is common to both feeds in order to be capable of merging cards from both feeds as well as sorting.

Analyzing means 400 controls the two feeds and the sort unit according to its setup. The well known control panel, or plugboard, with its associated selectors and circuits, is a suitable analyzing means. Sequence control signals from sequence-equal unit 600 provide the analyzing means with information to analyze.

As cards are read, their control number digits are impressed on input means 125 and 225 which form a comparator with order register 500; the digits are stored in counters 150 and 250, and the result of the comparison, order by order, is placed in order register 500. After reading and comparing time is over, the order register content is shifted into sequence-equal unit 600, high order first. The highest order to present an unequal condition sets the sequence-equal unit. If no orders are unequal, the unit remains reset to equal.

Should there be a high primary, the descending sequence analysis calls for operation of the primary feed only. As the card is read in the primary, its control number digits are impressed upon primary comparing means 125. No card is being read in secondary, but secondary counters 250, retaining the control number digits from the card read on the previous cycle, impress the control number digits upon secondary comparing means 225. Thus the content of the card being read in primary is compared with the stored content of the card read in secondary on the previous cycle. The results of the comparison appear in order register 500; after reading and comparing time is over, the order register content is shifted into the sequence-equal unit 600 to impress control signals upon analyzing means 400. On subsequent card cycles, there might be another high primary in which the operation would be repeated, or a different sequential relationship.

Figure 2:
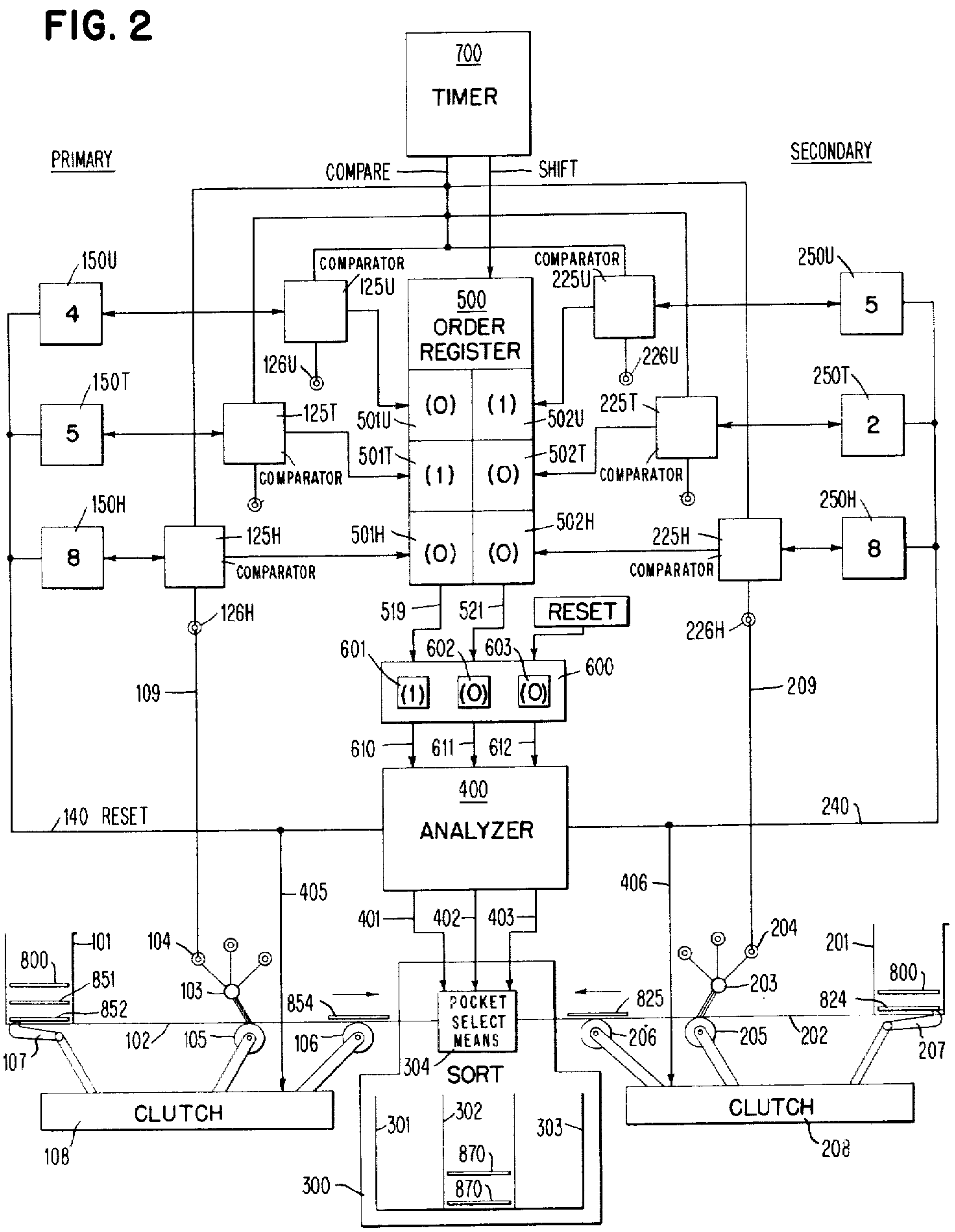
FIG. 2 is a semi-diagrammatic showing of the invention in operation.

*FIG. 2—Operation*

Primary feed 100 comprises hopper 101, record path 102, brushes 103, brush terminals 104, contact roller 105, feed roller 106, picker knives 107 and clutch 108 which controls movement of mechanical members 105, 106, and 107.

Secondary feed 200 comprises hopper 201, record path 202, brushes 203, brush terminals 204, contact roller 205, feed roller 206, picker knives 207 and clutch 208 which controls movement of mechanical members 205, 206, and 207.

Sort unit 300 comprises pockets 301, 302, and 303, and pocket selecting means 304.

Analyzing means 400 controls pocket selecting means 304 by means of signals on lines 401, 402, or 403, and controls clutches 108 and 208 by signals on lines 405 and 406 respectively.

Several cards, numbered from 800, are shown:

Cards 870 were previously read and merged into pocket 302.

Cards 854 and 825 have been read and compared but not merged—their control numbers appear in primary counters 150 and in secondary counters 250, respectively; their order-by-order comparison values appear in the order register 500. The content of the order register has been shifted into sequence-equal unit 600 which was set to high primary by the 1 in the tens order primary stage 501T. The parentheses indicate that the value representations shown are not retained at analysis time (see FIG. 3) their purposes previously having been served.

Cards 854, 852, 851, 825, and 824 will be separately fed in that order; cards 800 will then be fed together.

On cycles when both feeds operate (following an equal) the cards being read in primary and secondary feeds are compared immediately after they are read, order by order, into input means 125 and 225, which accept data signals over plugwires 109 and 209, respectively. The comparison result values of each order are then set into stages 501U–T–H and 502U–T–H. Cards punched in Hollerith code present punchouts to the reading brushes in descending sequence, 9–8–7—2–1–0, the particular digit punchout allowing the brush to complete a circuit at the respective digit time. Since the primary and secondary feeds are synchronous, the higher digit for each order is indicated by the earlier arrival of the brush-punchout signal to input means 125 or 225. This input means controls the related stage 501 or 502 of the order register 500 by entering a high primary representation in 501, high secondary representation in 502, or no representation if primary and secondary are equal. At the conclusion of reading and comparing time, the content of the order register 500 is shifted, high order 501H—502H first, into the sequence-equal unit 600. With the cards as shown in FIG. 2, the hundreds orders being respectively equal, no change occurs in the sequence-equal unit, which remains reset to "equal." The tens order has a "high primary"; it causes the sequence-equal unit to lock on "high primary," preventing the high secondary representation for the units order from affecting the control signal, although all orders are shifted to the sequence-equal unit.

After all the order values from the order register have been presented to the sequence-equal unit, a control pulse driver presents a pulse on the high primary, high secondary, or the equal lines 610, 611, or 612 as set up in the sequence-equal unit. In the example given, the high primary hub is pulsed. Analyzing means 400 connects the pulse to the primary clutch; this pulse causes the primary feed to operate, while the secondary feed is latched up.

On the following cycle, the primary card 852 only is read. The secondary counters are controlled to emit digit pulses according to the value stored, 825. At 9 digit time, no brush pulses occur since there are no 9 punchouts, and since no counter contains a 9, no pulses arrive from that source. At 8 time, the primary brush connected to the hundreds position 501H completes a circuit through the 8 punchout and presents a pulse to input means 125H—the secondary hundreds counter 250H, which contains an 8, presents a similarly timed pulse to the input means 225H. The two inputs being coincident, the comparing means causes no indication to be set into the hundreds order of the order register. There are no 7's or 6's. At 5 time, the primary brush pulse for the tens position is presented to the input means 125T unaccompanied by any corresponding pulse from the tens position secondary counter 250T to comparing means 225T, causing the setting a high primary indication into the hundreds position of the order register. Similarly, at 5 time, the secondary units brush completes a circuit to comparing means 225U; comparing means 125U not being similarly pulsed at 5 time, the units order 502U is set to 1, indicating high secondary in that order. At 4 time the brush presents a pulse to the units position, but this pulse is not operative because the order register units stage 502U has previously been set to high secondary for the units position. The 2 pulse from the secondary tens counter is also inoperative because the order register tens stage 501T was previously set by the 5 brush pulse.

At shift time, after reading and comparing time, the content of the order register is shifted into the sequence-equal unit 600 to set up a high primary control state, a 1 in high primary unit 601.

At analysis time, slightly after shift time, the sequence-equal unit is interrogated for control signals to analyzing means 400.

Figure 3:
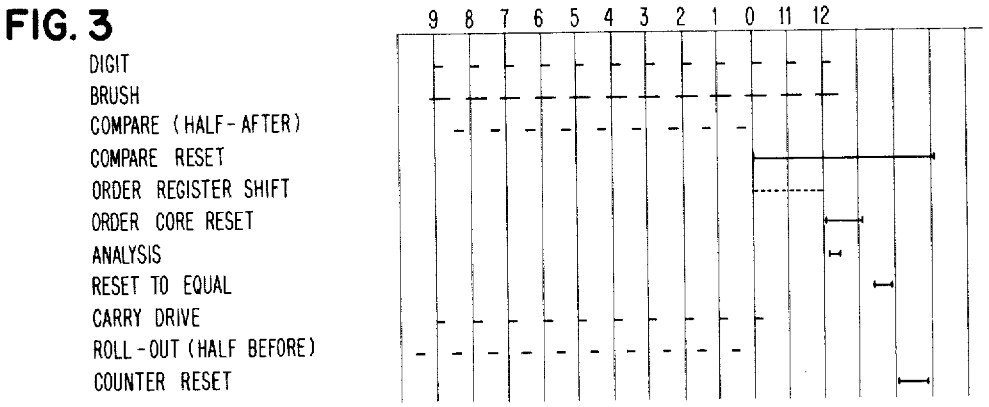
FIG. 3 is a timing diagram.

*FIG. 3—Timing Diagram*

Master machine circuit breakers 700 of the collator provide a series of digit pulses which occur during the times that read brushes 103 and 203 are completing circuits through the digit punches in the record cards being read, as illustrated in the timing diagram, FIG. 3. Half-after pulses are also produced, which occur between digit pulses, and are used to control read-in to the counters. Order register drive pulses, a control drive pulse, reset pulses, pulses to drive and pulses to read-out the counters are also provided.

Pulses to operate magnetic cores should preferably be filtered through electronic circuits to remove transients; the combination of circuit breakers with such electronic circuits is well known. Where capacitor transfer circuits are involved, pulses must be of proper characteristics to achieve the desired function. For example, a shift pulse must be of sufficient amplitude and duration to switch a core from 1 to 0, but must subside immediately thereafter to avoid overriding the transfer capacitor. The reset function, conversely, is achieved by a long duration pulse of low amplitude, or by a higher amplitude pulse of sufficient duration to override the transfer capacitor.

Figure 4:
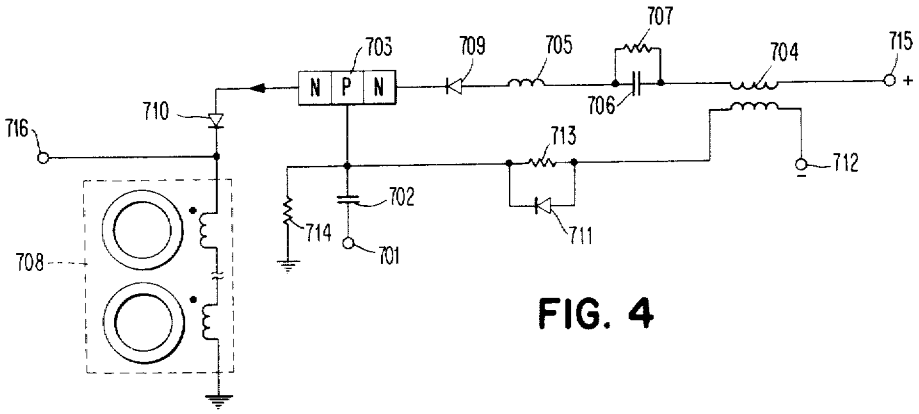
FIG. 4 is a schematic diagram of a magnetic core driver.

*FIG. 4—Driver*

FIG. 4 illustrates a suitable driver for magnetic cores operating with capacitor transfer circuits.

The driver is operated by a relatively positive pulse at terminal 701, which is coupled through capacitance 702 to the base of NPN transistor 703, biasing the transistor for increased conduction. As conduction increases, the change in current through the collector circuit causes regenerative feedback through transformer 704 to the base of the transistor which goes toward saturation.

The input pulse at terminal 701 being differentiated out by capacitance 702, and the feedback bias no longer existing when current becomes steady at saturation, the transistor is cut off when saturation is reached.

The resonant action of inductance 705 (which may be the inductance of the primary of transformer 704), capacitance 706, and resistance 707, controls the rate of change of current through the transistor load circuit 708 to provide standardized time duration to the current pulse for proper power output. Rectifiers 709 and 710 prevent reverse currents from turning on the transistor; rectifier 711 provides a low resistance path for positive feedback signals without impairing the function of the negative bias circuit from terminal 712 through resistances 713 and 714. Terminal 712 is connected to a negative power line; terminal 716 is a convenient input connection for reset pulses.

Figure 5:
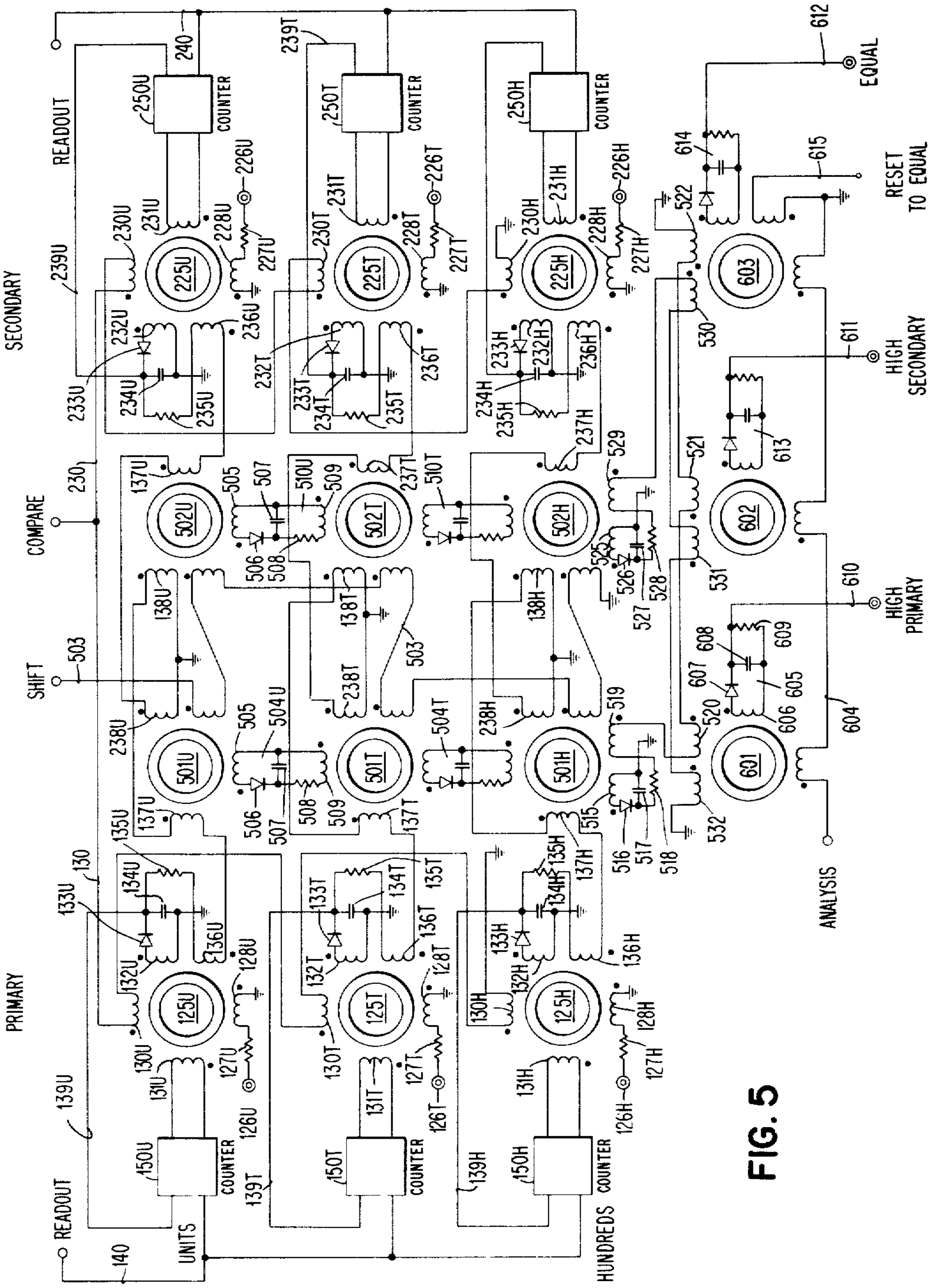
FIG. 5 is a schematic electrical diagram of the sequence comparing unit of the invention.

*FIG. 5—Sequence Comparing Unit*

This figure is a schematic diagram of the electronic portion of FIGS. 1 and 2, in which magnetic binary cores form the input means, order register, and high-low-equal circuit. The magnetic cores are generally of the type having rectangular hysteresis loops, capable of assuming and retaining one or the other of two magnetic states under control of current in their windings, and of controlling currents through their windings according to magnetic state.

Figure 6:
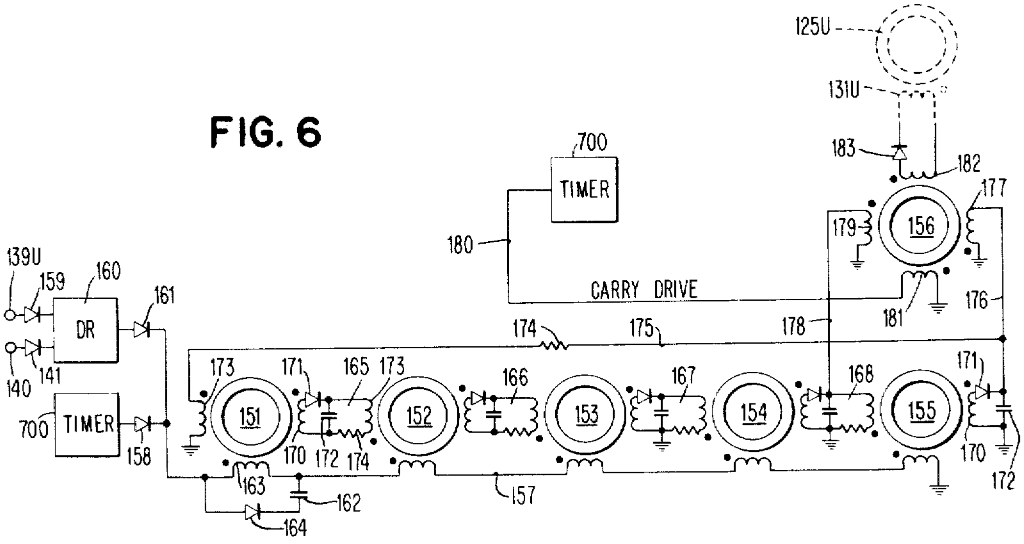
FIG. 6 is a schematic electrical diagram of a suitable magnetic core type counter for use in the sequence comparing unit of FIG. 5.

The counters may take several forms, a suitable form being more particularly discussed under subheading "FIG. 6—Counters," infra. These counters need only be capable of accepting timed digit pulses and emitting similarly timed digit pulses on subsequent cycles, and be compatible with the input cores.

The states of remanence of the magnetic cores are designated 1 and 0, according to the convention, and the dot notation is used. A positive pulse at the no-dot end of a winding drives the core toward the 1 state; if there is a change of state of the magnetic cores as a result, induced positive pulses appear at the no-dot terminals of all other windings of the core. A positive pulse at the dot end of a core winding drives the core toward the 0 state; if there is a change of state of the magnetic core as a result, induced positive pulses appear at the dot ends of all other windings of the core.

Four magnetic cores comprise the order register stages and the input means for each order. They are designated 125U, 501U, 502U, and 225U for the units order, 125T, 501T, 502T, and 225T for the tens order, and 125H, 501H, 502H, and 225H for the hundreds order.

Three magnetic cores comprise the sequence-equal unit 600. They are high primary core 601, high secondary core 602, and equal core 603.

Primary brush input hubs 126U, 126T, and 126H connect digit pulses from the primary units, tens, and hundreds position brushes (103—FIG. 2), respectively, to input cores 125U, 125T, and 125H, respectively.

Secondary brush input hubs 226U, 226T, and 226H similarly connect digit pulses from the secondary units, tens, and hundreds position brushes (203—FIG. 2), respectively, to input cores 225U, 225T, and 225H, respectively.

*FIG. 5—Read and Compare*

Positive voltage digit pulses from the brushes 103 and 203 (FIG. 2) are of polarity to drive their related input cores 125U—125T—125H or 225U—225T—225H to the magnetic remanence state 1 (a positive pulse in the no-dot end of the winding switches a core toward 1). Resistances 127U—127T—127H and 227U—227T—227H are sufficient to limit current through the windings 128U—128T—128H and 228U—228T—228H to a value sufficient to switch the input cores to 501U—501T—501H and 502U—502T—502H 1 without inducing, in the other windings of the input cores, currents of sufficient power to switch other cores. The input cores are reset to 0 late in each machine cycle, by means to be explained infra. They therefore remain at 0 until set to 1 by a digit pulse from the reading brush.

Half-after digit pulses from master timer 700 are impressed upon input core drive lines 130 and 230, which traverse each input core in a direction to drive each input core toward 0. In the illustration given, the coincident reading of cards 854 in primary and 825 in secondary, no 9's appear and no input core is set to 1 at 9 digit time. The half-after 9 pulse, though it drives all input cores toward 0, does not produce any output pulses from the input cores since they do not change state, all cores remaining at 0.

Both hundreds order positions in the card contain 8's. At 8 digit time cores 125H and 225H are set to 1 by the trickle current through resistances 127H and 227H and windings 128H and 228H. At half-after 8 time, the input cores are driven to 0; cores 127H and 227H change state and induce positive pulses at the dot ends of all of their other respective windings.

The currents induced in windings 131H and 231H, counter output windings, are blocked within the counters. The current induced in winding 132H passes through rectifier 133H onto line 139H to cause counter 150H to step one unit; since the counter was previously reset it then contains a 1. Similarly, the current induced in winding 232H causes counter 250H to step one unit and thereby contain a 1.

The current induced in winding 132H passes through rectifier 133H to charge capacitance 134H, which, upon termination of the half-after pulse through winding 130, discharges through resistance 135H and winding 136H which is wound to reinsert the 1 back into core 125H. Similarly, the current induced in winding 232H also passes through rectifier 233H to charge capacitance 234H, which, upon termination of the half-after pulse through winding 230, discharges through resistance 235H and winding 236H.

The current induced in winding 136H passes through windings 137H and 138H; but the current induced in winding 236H passes through windings 237H and 238H simultaneously. These currents buck and cancel, without switching either order register core 501H or 502H.

At 7 time, no impulses are received from the card. The half-after pulse, however, switches cores 125H and 225H to 0, inducing currents in the windings to step counters 150H and 250H one unit (to two) and the reinserts 1's in input cores 125H and 225H. Since there are 1's in both input cores, their outputs buck and cancel without affecting order register cores 501H and 502H.

At 6½ time, counters 150H and 250H step to 3; at 5½ time they step to 4; at 4½ time to 5; at 3½ time to 6; at 2½ time to 7; at 1½ time to 8.

Meanwhile, counters 150T and 250U started receiving pulses at 5 time when their related input cores were set to 1 by brush reading pulses at terminals 126T and 226U. There two counters stepped to 1 at 5½ time; to 2 at 4½ time, to 3 at 3½ time, to 4 at 2½ time, an to 5 at 1½ time. Counter 150U similarly counted the 4 half-after pulses which occurred after its input core 125U was set to 1 at 4 time; counter 250T counted the two half-after pulses which occurred after its input core 225T was set to 1 at 2 time. There is no half-after zero pulse; instead a longer duration reset pulse resets the input cores as lines 130 and 230 are impulsed by a trickle pulse which does not charge capacitors 134U–T–H or 234U–T–H sufficiently to re-insert 1's in th input cores or to step the counters.

At 5½ time, when the compare drive pulse appeared at windings 130T and 230T, there was a change of state of core 125T, which had been set to 1 at 5 digit time by the brush impulse. A positive pulse was induced in winding 132T, which, in addition to reinserting a 1 into core 125T via winding 136T, inserted a 1 into core 501T via winding 137T, while keeping core 502T at 0 via winding 138T. The tens order of the order register 500 thereby was set to high primary as indicated by a 1 in core 501T (see FIG. 2). At 4½ and 3½ times, core 125T was again driven to 0, and again a 1 was reinserted in core 125T, core 501T (containing a 1) was driven toward 1 without change of state and core 502T (containing a 0) was driven toward 0 without change of state.

At 2 digit time, however, core 225T was set to 1 by the brush pulse. The 2½ compare drive pulse through windings 130T and 230T induces pulses in windings 132T—137T—138T and 232T—237T—238T, respectively, which buck and cancel without changing the states of order register core 501T (1) or 502T (0).

The action of the units order was similar, the 5 read into input core 225U causing a 1 to be set into order register core 502U at 5½ time, and, upon the later setting of core 125U to 1 by the 4 brush pulse and 4½ compare drive pulse, causing currents affecting cores 501U and 502U to buck and cancel. At the end of read and compare time, the order register cores contain the values shown in parentheses in FIG. 2 for card 854 in primary and 825 in secondary.

*FIG. 5—Order Register and Sequence-Equal Unit*

Commencing after the termination of the half-after 1 compare drive pulse in the card cycle, a series of order register shift pulses are generated by master timing means 700, at least one pulse for each order of the sequence comparing unit. These shift pulses are impressed on line 503 which traverses each core of the order register in series, polarized to drive all order register cores to 0. Between each primary order core 501U—501T—501H there is a Harvard transfer circuit 504U—504T, having a winding 505 on the low order core, rectifier 506, capacitance 507, resistance 508 and a winding 509 on the high order core. Between each secondary order core 502U—502T—502H there is a similar transfer circuit 510U—510T.

There are 1's in cores 502U and 501T in the example given. The first shift pulse, traversing all the order cores, causes changes of state only in 502U and 501T; 1's are shifted into cores 502T and 501H.

The 1 is shifted from 502U to 502T as follows:

The positive shift pulse in the dot end of winding 503 on core 502U drives core 502U from 1 to 0, inducing a positive pulse at the dot end of winding 505 in transfer circuit 510U. This positive pulse passes through rectifier 506 in the low-impedance direction to charge capacitance 507. At the termination of the shift pulse, capacitance 507 discharges through resistance 508 and winding 509, the positive pulse at the no-dot end of winding 509 driving core 502T to 1. The contents of the order register shift one order on each shift pulse. The 1 from order core 501T is in core 501H after the first shift pulse.

On the second shift pulse, order core 501H is driven to 0, inducing a current of positive polarity at the dot end of winding 515. The current passes through rectifier 516 in the low-impedance direction and charges capacitance 517. At the termination of the shift pulse, capacitance 517 discharges through resistance 518 into the no-dot end of winding 519 (reinserting a 1 into order core 501H) into the no-dot end of winding 520 (driving high primary core 601 to 1) and into the dot end of windings 521 (holding low primary core 602 at 0) and into the dot end of winding 522 (driving to 0 equal core 603 which had been previously reset to 1). Meanwhile, during the second shift operation, the 1 (originally in order core 502U) from order core 502T shifted into order core 502H.

During the third shift operation, order core 502H changes state from 1 to 0, inducing a positive pulse in winding 525 which passes through rectifier 526 in the low-impedance direction and charges capacitance 526, which, upon termination of the shift pulse, discharges through resistance 528 and windings 529, 530, 531, and 532. The positive pulse at the no-dot end of winding 529 reinserts a 1 in core 502H. Since order core 501H is reading out coincidentally with order core 502H the oppositely-paired windings 532—520 and 531—521 buck and cancel, leaving core 601 set to 1 to retain a high primary indication. The paired windings 522—530 merely hold core 603 at 0. After a sufficient number of shift pulses to read out all the orders in the order register have been supplied on line 503, a pulse of longer duration is supplied to reset order cores 501H and 502H, overriding capacitors 517 and 527 which otherwise would reinsert 1's in their associated order cores.

It has been shown how the order comparison indications are shifted, high order first, into the sequence-equal circuit, which was previously reset to equal (1 in equal core 603). The order register shifts two lines of high representations, the high primary representations (1's in order cores 501U—501T—501H) into high primary core 601 and the high secondary representations (1's in order cores 502U—502T—502H) into the high secondary core 602. The hundreds orders were equal; the sequence-equal cores remained set to equal. The next shift, a high primary, set the sequence-equal circuit to high primary, and reinserts a 1 in the primary hundreds order core. On subsequent shifts, the 1's which might occur in secondary are paired with the 1's in primary to buck and cancel.

*FIG. 5—Analysis*

An analysis pulse from master timing means 700 onto line 604 drives all sequence-equal cores toward 0 immediately after shifting is completed. Transfer circuit 605 accepts the pulse induced by the core storing the sequence-equal representation (1 in 601 for high primary) as it changes state. A positive pulse appears at the dot end of winding 606, passes through rectifier 607 in the low impedance direction, and charges RC network 608—609. Upon termination of the analysis pulse, capacitance 608 discharges along line 610 to the analyzing means 400. Lines 611 and 612 similarly conduct high secondary and equal pulses, respectively, to the analyzing means on other card cycles where the appropriate condition exists, as signalled by operation of transfer circuits 613 and 614, respectively. After analysis time, equal core 603 is reset to 1 (equal) by a positive pulse on line 615 from circuit breakers 700.

*FIG. 6—Counter*

FIG. 6 illustrates a suitable counter 150U for use within the invention. Counters 150U—150T—150H and 250U—250T—250H may preferably be identical for interchangeability, but any rollable decade counter capable of the required speeds and compatible with the components used in the order register and input means will suffice.

Five counting cores are shown, numbered 151, 152, 153, 154, and 155, in the well known folded ring configuration. Carry core 156 is the output element. Prior to the commencement of counting a relatively long duration positive counter reset pulse from master timing means 700 is impressed on line 157 through rectifier 158 in the low impedance direction. The counter reset pulse at the dot end of the windings on the counting cores and carry core switches the cores to 0 and overrides the discharge of capacitors in the transfer circuits.

As counting commences the output of the associated input comparing core (125U—FIG. 5) and capacitor 134U appears on line 139U, passes through rectifier 159 in the low impedance direction and conditions driver 160. Driver 160 produces a positive drive pulse on line 157 suitable in amplitude and duration to drive all the counting cores and the carry core to 0, and subside without overriding the transfer capacitors. The drive pulse passes through rectifier 161 in the low impedance direction, charging capacitor 162, which discharges through winding 163 and rectifier 164 in the low impedance direction, inserting a 1 in core 151.

On subsequent counts up to 5, 1's are generated into core 151 and transferred successively to cores 152, 153, 154, and 155 via capacitor transfer circuits 165, 166, 167, and 168, each of which comprises an output winding 170, rectifier 171, capacitance 172, input winding 173 and resistance 174. The output of core 155 is fed back along line 175 to core 151, the input winding 173 of which is inverted in sense, so that a 1 output of core 155 drives core 151 toward 0 coincidently with the attempt by capacitance 162 to reinsert a 1. Since core 151 is in the 1 state, induced by the drive pulse on line 157 through winding 163, it remains at 0. On the seventh pulse, the 0 is shifted to counting core 152, core 151 being held at 0. On the eighth and ninth pulses, counting cores 153 and 154 are also set to 0. On the tenth pulse, a 1 is inserted into carry core 156, which previously remained at 0. The output pulse induced as counting core 155 switched from 1 to 0, stored temporarily in capacitance 172, is carried along line 176 to winding 177 to drive the carry core to 1. Similar outputs on line 176 as the counter recorded pulses 6, 7, 8, and 9 were not effective to drive the carry core to 1, since counting core 154 was being switched simultaneously, its transfer capacitance discharging along line 178 through winding 179. Winding 179 being opposite in sense to winding 177, the two pulses bucked and canceled.

The carry core is subject to carry core drive pulses from master timing means 700 along line 180 through winding 181 to drive core 156 to 0. Upon change of state from 0 to 1, carry core 156 induces a positive pulse at the dot end of its output winding 182, which passes through rectifier 183 in the low impedance direction through winding 131U (see FIG. 5) to switch comparing core 125U to 1.

*FIGS. 2, 3, 5—Counter-Card Comparing*

On the card cycle following the reading of cards 854 and 825 (FIG. 2) analyzing means 400 commands only the primary feed 100 to operate to feed card 852 from primary hopper 101. It is necessary to compare the 852 read from the card with the 825 stored in the secondary counters 250U—250T—250H, since card 825 cannot conveniently be read by brushes 203.

As card 852 approaches brushes 103, it is desirable to reset the primary counters so that the 852 may be stored for future use. A reset type pulse on the appropriate line 140 is included as a matter of course with every energization of primary clutch 108 to reset counters 150U—150T—150H. Similarly, counters 250U—250T—250H are reset by a reset pulse on line 240 with every energization of secondary clutch 208.

As the 9 row in card 852 is scanned by the primary brushes, no nines being present in the card, comparing cores 125U—125T—125H remain at 0. Slightly prior to 9 digit time, the first of ten half-before roll-out pulses was impressed on line 240, rolling each counter one unit (from 825 to 936). A carry core drive pulse at 9 digit time is ineffective.

As the 8 row in card 852 is scanned, at 8 digit time, comparing core 125H receives a 1. At half-before 8 time, however, the second of the ten half-before roll-out pulses was impressed on line 240, rolling each counter one unit (from 936 to 047, with a carry set up in counter 250H). The carry core drive pulse switches the carry core to 0, inducing a current in winding 231H of comparing core 225H. At half-after 8 time, when compare drive lines 130 and 230 are impulsed, the outputs of comparing cores 125H and 225H buck and cancel, without effecting any change of state in the order register hundreds cores 501H and 502H.

At half-before 7 time, counters 250U—250T—250H are rolled from 047 to 158. No 7 digit is in card 852.

At half-before 6 time, the counters roll from 158 to 269.

At half-before 5 time, the secondary counters roll from 269 to 370; the carry in the units position, which is unaccompanied by a 5 digit from the card, is read out at 5 digit time to set the units order input core, and thus the units order of the order register to high secondary. At 5 time, the 5 read from the primary card tens order, which is unaccompanied by a coincident pulse from the tens order counter, sets the tens order to high primary.

At half-before 4 time, the secondary counters roll from 370 to 481.

At half-before 3 time, the secondary counters roll from 481 to 592.

At half-before 2 time, the secondary counters roll from 592 to 603, emitting a carry in the secondary tens order. A 2 is read from the primary card units order. Since both the tens order and units order have previously been set to high primary and high secondary, respectively, there is no effect upon the order register.

At half-before 1 time, the secondary counters roll from 603 to 714.

At half-before 0 time, the secondary counters roll from 714 to 825, which is the number stored from card 825 during the previous card cycle. Since card 852 in primary is higher, it will be fed, and on the subsequent card cycle card 851 will be compared with the number stored in the secondary counters.

Card 851 will be a high primary, and will be fed; card 800 will then be compared with the 825 stored. A high secondary condition will be detected, and card 824 will be fed from secondary, leaving the 800 stored in the primary counters for comparison with the 800 in the secondary card. The equality of the 800 stored in primary with the 800 read from the secondary card will be sensed, and both cards 800 fed coincidently to complete the merging, by descending sequence, of the cards shown in FIG. 2.

The invention has been explained in connection with the well known dual-feed sorter or collator, but its use is not so limited. Applications to multiple-feed sorters, or to less demanding operations such as sequence checking where counters may be eliminated, for example, are obvious to those skilled in the art.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A sequence unit for repetitively comparing data received in digit pulse form from plural sources, selected ones of which may subsequently be interrupted in response to the results of the comparison, comprising:

a plurality of counters, one for each order of data received from each source;

means to reset said counters;

means to set said counters to values corresponding to the digit pulse values received from said sources;
means for interrupting the data transmission from selected ones of said sources;
input means for each order for selectively receiving digit pulses from the sources when said sources are uninterrupted and for receiving digit pulses from the uninterrupted sources and the counters associated with the interrupted sources when selected ones of said sources are interrupted;
said input means including comparison means for generating comparison values;
an order register having a plurality of orders comprising means to store said comparison values;
means connecting each order of said input means to an associated order of said order register;
a sequence-equality indicating circuit coupled to said order register;
means for shifting comparison values from said order register in order of significance into said sequence-equality indicating circuit, said sequence-equality indicating circuit being adapted to lock to a state representative of the first unequal comparison value received by it so as to be nonresponsive to subsequent unequal comparison values supplied thereto, and including means to issue a control signal indicating the receipt of said comparison values;
means for transmitting said control signals to said interrupting means to cause said interrupting means to interrupt selected ones of said sources.

2. A sequence comparing machine adapted to receive data signals from two sources, a selected one of which may subsequently be interrupted in response to the results of the comparison, comprising:
a primary record reading means;
a secondary record reading means;
analyzing means, including sequence-equality indicating means for generating first, second, and third control signals;
master timing means;
a primary counter;
a secondary counter;
input means;
signal means controlled by said analyzing means and said master timing means for presenting differentially timed data signals in the form of digit pulses to said input means selectively, from said primary record reading means and said secondary record reading means when said sequence-equality indicating means produces a first control signal, and from said primary record reading means and said secondary counter when said sequence-equality indicating means produces a second control signal, and from said primary counter and said secondary record reading means when said sequence-equality indicating means produces a third control signal;
said input means including comparing means for generating comparison results;
an order register coupled to said comparing means for receiving a comparison result from said comparing means as the result signal is generated;
a sequence-equality indicating circuit coupled to said order register;
means for shifting comparison values from said order register in order of significance into said sequence-equality indicating circuit, said sequence-equality indicating circuit being adapted to lock to a state representative of the first unequal comparison value received by it so as to be nonresponsive to subsequent unequal comparison values supplied thereto, and including means to issue respective first, second, and third control signals to indicate the receipt of comparison values that are respectively, equal, unequal in a first sense, and unequal in a second sense;
means for transmitting said control signals to said interrupting means to cause said interrupting means to interrupt selected ones of said sources.

3. A sequence comparing system comprising:
a primary multichannel data source;
a secondary multichannel data source;
comparing means for comparing the data received in each primary channel with that received in the corresponding secondary channel;
an order register having comparison result storage means for each channel of data;
means for transferring into said result storage means the result from said comparing means as the comparison is made;
sequence-equality indicating means coupled to said order register and responsive to the comparison result values from said order register; and
means for shifting the channel comparison results along said order register, by channel in order of significance, into said sequence-equality indicating means, said sequence-equality indicating means locking in response to the first unequal comparison result value received from said order register so as to be nonresponsive to subsequent unequal comparison result values from said order register.

4. A sequence unit comprising:
an order register having comparison result storage means for each order comparison;
means for developing and for entering comparison result values from corresponding orders of a plurality of data sources, each data source having a plurality of orders of known significance;
sequence-equality indicating means coupled to said order register and responsive to the comparison result values from said order register; and
means for shifting said comparison result values by order of significance into said sequence-equality indicating means, said sequence-equality indicating means locking in response to the first unequal comparison result value received from said order register so as to be nonresponsive to subsequent unequal comparison result values from said order register.

5. In a sequence unit for determining sequence of multi-order data from plural sources:
a counter for each order from each source;
an input core for each order from each source;
a comparison result value storage core for each order from each source;
comparison winding means interconnecting the input cores and comparison result cores for each order;
selectable means for sensing record data representations at digit times to set said input cores;
after-digit pulse means connected to said input cores to read-out said input cores if set;
counting winding means interconnecting the input core for each order from each source to the related counter; and
selectable means for rolling out the counter into the related input core, whereby data read from a card may be compared with data rolled out of a counter.

6. In a comparing system for determining sequential relationships between a primary and a secondary control number:
an order register having value storage means to store comparison values for each order in the control number;
a primary input core;
a secondary input core;
sensing means to set said input cores at digit times in response to data representations on records;
read-out means to read-out said input cores at after-digit times; and
connecting means interconnectiong said input cores and said value storage means to store values related to the pattern of set and unset conditions in related input cores.

7. In a comparing system for determining sequential relationships between a primary and a secondary control number:

an order register having value storage means to store comparison values for each order in the control number;

a primary input core;

a secondary input core;

sensing means to set said input cores at digit times in response to data representations on records;

read-out means to read-out said input cores at after-digit times; and connecting means interconnecting said input cores and said value storage means to store values related to the pattern of set and unset conditions in related input cores;

sequence-equality indicating means coupled to said order register and responsive to comparison values from said order register; and means to shift values from said order register to said sequence-equality indicating means in order of significance to extract sequence representations from the most significant order in which the control numbers are unequal, said sequence-equality indicating means locking in response to the first unequal comparison value received from said order register so as to be non-responsive to subsequent unequal comparison values from said order register.

8. In a cyclical sequence comparing unit for comparing a plurality of $n$-digit control numbers, the combination comprising:

an order register having $n$ value storage stages each being settable to a discrete value to represent sequential relationships between equal-order control number digits;

means for comparing equal-order digits and setting said value storage stages for the related orders during a comparison time in the operating cycle;

sequence-equality indicating means coupled to said order register and responsive to values from said order register; and shift means for transferring values from said storage stages to said sequence-equality indicating means, said sequence-equality indicating means locking in response to the first unequal value received from said order register so as to be nonresponsive to subsequent unequal values from said order register.

9. In a record collating machine for manipulating a plurality of records according to plural-digit control numbers manifested thereon:

cyclically operating master timing means defining, for each cycle, a series of differential digit timing pulses, before-digit timing pulses, after-digit timing pulses and related control timing pulses;

primary means comprising for each digit in the control number, primary storage means, primary sensing means to produce signals at digit times, primary input means, settable by signal from said primary sensing means, read-out means connecting said primary input means to said primary storage means to cause counting of after-digit pulses after the input means is set during a cycle, whereby said primary counter steps to the digit value corresponding to that sensed by said primary sensing means;

secondary means comprising for each digit in the control number, secondary storage means, secondary input means settable by a signal from said secondary sensing means, read-out means connecting said secondary input means to said secondary storage means to cause counting of after-digit pulses after the input means is set during a cycle, whereby said secondary counter steps to the digit value corresponding to that sensed by said secondary sensing means; and an order register comprising, for each digit of the control number, comparison value storage means, normally unset, and settable to represent sequential relationships of the associated digits of the primary and secondary control numbers, and winding means interconnecting said master timing means, said comparison value storage means, said primary input means and said secondary input means for setting said comparison value storage means according to the set-unset pattern of the related input means.

10. A record collating machine for manipulating a plurality of records according to plural-digit control number manifestations thereon, each control number having a units order and successively higher orders including a highest order, comprising:

(I) Master Control Means comprising:

(A) cyclic timing control means 700 for producing, for each master cycle, a series of timing pulses, including—

(1) differential digit timing pulse means, (2) before-digit timing pulse means, (3) after-digit timing pulse means, and (B) analyzer means 400 responsive to sequence conditions of a previous cycle to provide control signals to control selectively, on a particular cycle, an associated one of three groups of functions, the control signals being—

(1) feed and read both primary and secondary records, after an equal sequence condition, (2) feed and read a primary record and roll out secondary counter, after a high primary condition, (3) feed and read a secondary record and roll out primary counter, after a high secondary condition, (C) control connection means connecting said analyzer means to other mechanisms for response to the control signals;

(II) Units Order Means comprising:

(A) a rollable primary storage counter 150U for counting input pulses and for providing an output pulse as it rolls back to zero value;

(B) primary means comprising primary sensing means to produce a signal at a digit time, a primary input core 125U settable by a signal from said primary sensing means, a compare winding 130U connecting the master timing means at after-digit times to said input core 125U to read out said input core 125U, a read-out winding 132U connecting said primary input core 125U to said primary counter 150U and regeneration means 134U—136U connecting said input core 125U back to itself to cause counting of after-digit pulses after the input core 125U is set by a signal from said sensing means at a digit time whereby said primary counter 150U steps to the digit value corresponding to that sensed by said primary sensing means;

(C) a counter rollout winding connecting said primary counter 150U back to said input core 125U;

(D) a rollable secondary storage counter 250U for counting input pulses and providing an output pulse as it rolls back to the zero value;

(E) secondary means comprising secondary sensing means to produce a signal at a digit time, a secondary input core 225U settable by a signal from said secondary sensing means, a compare winding 230U connecting the master timing means at after-digit times to said input core 225U to read out said input core 225U, a read-out winding 232U connecting said secondary input core 225U to said secondary counter 250U and regeneration means 234U—236U connecting said secondary input core 225U back to itself to cause counting of after-digit pulses after the secondary input core 225U is set by a signal from said sensing means at a digit time, whereby said secondary counter 250U steps to the digit value corresponding to that sensed by said secondary sensing means;

(F) a counter rollout winding connecting said secondary counter 250U back to said input core 225U;

(G) order register comparison value storage cores 501U and 502U, normally unset, and settable to represent sequential relationships of the associated units digit of the primary and secondary control numbers;

(H) winding means including elements 133U—138U interconnecting said primary input core 125U with said order register cores 501U and 502U, windings 137U and 138U being oppositely oriented;

(I) winding means including elements 233U—238U interconnecting said primary input core 225U with said order register cores 501U and 502U, windings 237U and 238U being oppositely oriented with respect to each other and with respect to windings 137U and 138U, respectively;

(J) whereby the order register primary units core 501U is settable from the set condition of primary input core 125U at a given after-digit compare time if secondary input core 225U is unset, to indicate the condition "high primary" for the units order, the order register secondary units core 502U is settable from the set condition of secondary input core 225U at a given after-digit time if primary input core 125U is unset, to indicate the conditon "high secondary" for the units order, and said windings 137U, 138U, 237U and 238U buck and cancel when both input cores 125U and 225U are coincidently read out, after being set, at an after-digit time so that the comparison value cores on applicable cycles remain reset after the application to said input cores 125U and 225U similarly timed digit pulses, remain set to high primary after the application to said input cores 125U and 225U in sequence of a primary digit pulse and a later secondary digit pulse, and remain set to high secondary after the application to said input cores 125U and 225U in sequence of a secondary digit pulse and a later primary input pulse;

(III) Higher Order Means comprising:

(A) duplicate means for each higher order including the highest order for operating in parallel with and similarly to said units order means I, the highest order including comparison value cores 501H and 502H;

(B) whereby the respective orders of comparison value storage cores 501 and 502 are settable to respective order comparison values;

(V) Shift Means comprising:

(A) shift coupling means 504 and 510 for coupling said comparison value storage cores 501 and 502 in each order except the highest order to corresponding higher order cores to provide shift capability to said storage cores 501 and 502, forming an order register 500, and conditionable by a longer duration order core reset pulse to reset said comparison value storage cores;

(B) a shift winding 503 connected to said master timing means 700, conditionable by an order register shift pulse following the final digit pulse, for shifting comparison values from said comparison value storage cores to respectively corresponding higher order comparison value storage cores;

(V) High-Low-Equal Means comprising:

(A) high primary core 601;

(B) high secondary core 602;

(C) equal core 603;

(D) reset-to-equal winding 615 connected to said master timing means 700 to set said equal core to the equal state;

(E) primary highest order coupling means 515—522 for responding to the readout of a high primary setting in said highest order primary comparison value storage core 501H by driving said storage core 501H back to the high primary setting, by driving said high primary core 601 towards its set value and by driving said high secondary core 602 and said equal core 603 toward their unset values;

(F) secondary highest order coupling means for responding to the readout of a high secondary setting in said highest order secondary comparison value storage core 502H by driving said storage core 502H back to the high secondary setting, by driving said high secondary core 602 toward its set value and by driving said high primary core 601 and said equal core 603 toward their unset values;

(G) analysis winding 604 connected to said master timing means 700 and to said high primary core 601, said high secondary core 602 and said equal core 603; and (H) high-low-equal output coupling means 605—614 for coupling high primary, high secondary and equal signals to said analyzer 400.

References Cited in the file of this patent

UNITED STATES PATENTS

| | | |
|---|---|---|
| 2,877,445 | Cheilik | Mar. 10, 1959 |
| 2,884,616 | Fillebrown et al. | Apr. 28, 1959 |
| 2,901,732 | Canning | Aug. 25, 1959 |
| 2,941,191 | Tyrlick | June 14, 1960 |
| 2,967,949 | Loewe | Jan. 10, 1961 |